Patented Oct. 28, 1924.

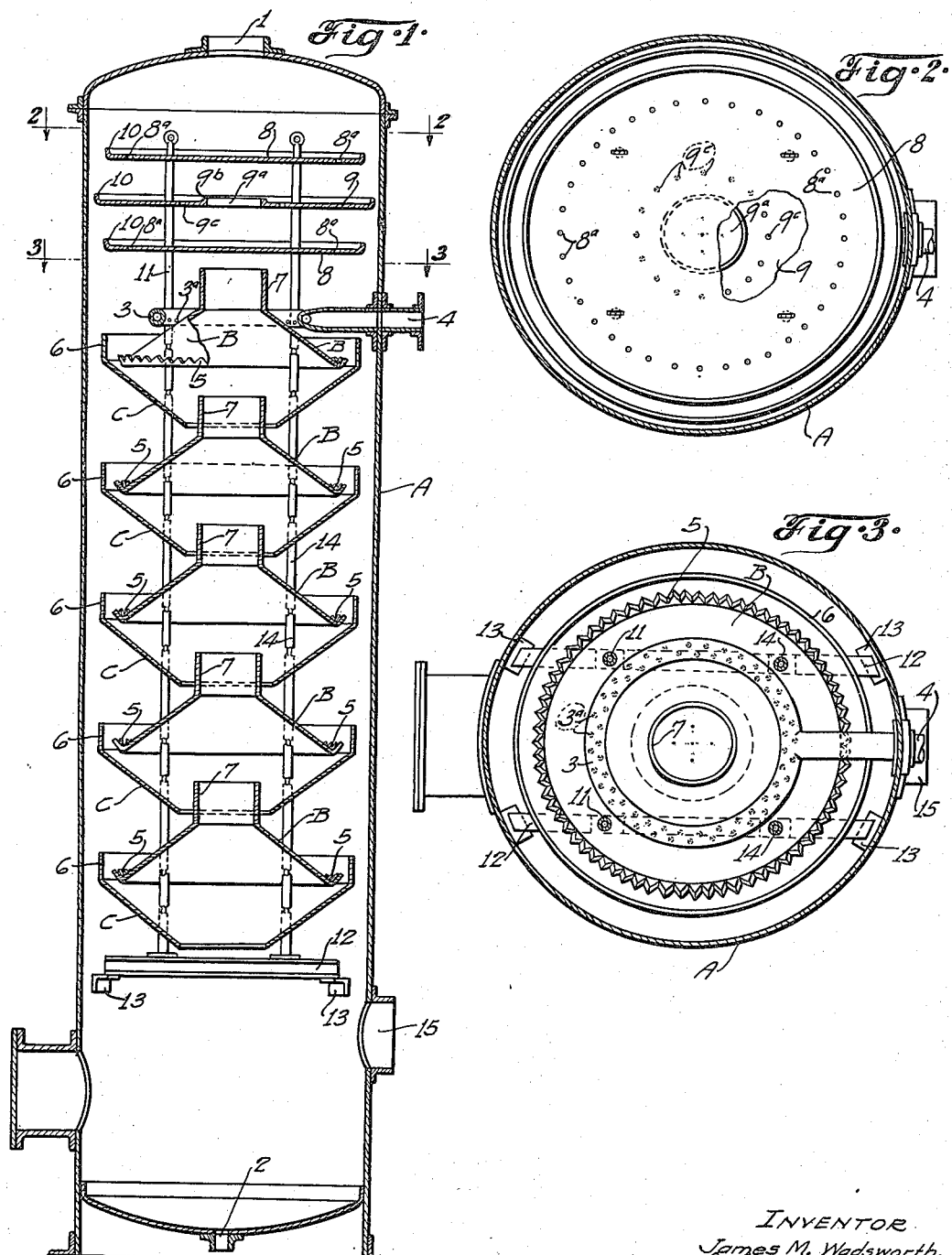

1,513,354

UNITED STATES PATENT OFFICE.

JAMES M. WADSWORTH, OF FORT WORTH, TEXAS.

VAPOR SEPARATOR.

Application filed December 27, 1921. Serial No. 525,169.

*To all whom it may concern:*

Be it known that I, JAMES M. WADSWORTH, a citizen of the United States, residing at Fort Worth, Texas, have invented a certain new and useful Improvement in Vapor Separators, of which the following is a full, clear, and exact description, such as will enable others skilled in the art to which it appertains to make and use the same.

This invention relates to vapor separators, and particularly vapor separators of the kind that are used for separating vapor from oil which is heated substantially to the vaporization point before it is introduced into the separating chamber of the apparatus.

One object of the invention is to provide an apparatus that will effectively separate vapor from oil that is laden with vapor and also promote the vaporization of the constituents of the oil whose boiling points are below the temperature of the oil passing through the separating chamber of the apparatus.

Another object is to provide an apparatus for separating vapor from liquid oil which is so constructed that the vapor separated from the oil will not be subjected to a scrubbing action by the liquid oil, thereby preventing the separated vapor from being re-condensed or absorbed by the oil. Other objects and desirable features of my invention will be hereinafter pointed out.

To this end I have devised a vapor separator that consists of an upright separating chamber and a vaporizing means in said chamber over which liquid oil flows and constructed in such a manner that separate paths of travel are provided for the liquid oil and for the vapor that separates from the oil. In using the apparatus it is preferable to subject the oil to heat under pressure or confinement and then spray said heated oil into the upper portion of the separating chamber so as to cause a considerable portion of the lighter constituents of the oil whose boiling points are below the temperature of the oil as it is delivered to the separating chamber to be immediately vaporized. This method of handling the oil insures the separation of most of the vapor mingled with the oil immediately upon the introduction of the oil into the separating chamber, the remainder of the vapor which is mechanically confined by the oil subsequently separating from the oil during the travel of the oil through the separating chamber.

The vaporizing means in the separating chamber can be constructed in various ways without departing from the spirit of my invention, but I prefer to form said vaporizing means from a series of oppositely-inclined baffles arranged in alternate relation, one above the other, and of such form that the liquid oil can travel downwardly through the separating chamber and the vapor that separates from the oil can rise upwardly through said chamber by separate paths, thereby preventing the vapor from being scrubbed by the liquid oil, and consequently, reducing the liability of the vapor re-condensing or being absorbed by the oil. In order to release the vapor that is mechanically confined by the oil means is preferably provided for breaking up the oil as it travels downwardly through the separating chamber, and while various means may be used for this purpose, I prefer to provide certain of the baffles with serrated portions over which the liquid oil travels and which are so arranged that they cause the liquid oil to be spread out evenly or distributed uniformly over the baffles in its downward travel over the baffles.

While I prefer to cause the oil to be vaporized solely by the heat in it as it enters the separating chamber, it will be understood that the vaporization of the oil may, if desired, be assisted by a vacuum or by externally heating the separating chamber of the apparatus.

Figure 1 of the drawings is a vertical sectional view of a vapor separator constructed in accordance with my invention; and Figures 2 and 3 are horizontal sectional views, taken on the lines 2—2 and 3—3, respectively, of Figure 1.

Referring to the drawings, A designates a vertically-disposed, tubular-shaped separating chamber preferably of cylindrical shape in horizontal cross section and provided in its top with a vapor outlet 1 and in its bottom with an outlet 2 for the liquid oil. Said separating chamber is equipped with a vaporizing means which is formed preferably by two series of oppositely-inclined baffles arranged in alternate relation, one above the other, and means is provided for spraying oil into the upper portion of the separating chamber at a point above the topmost baffle. The baffles B of one series are substantially frusto-conical-shaped and are arranged one above the other, as shown in Figure 1. The baffles C of the other series are of substantially inverted frusto-conical-shape and are arranged intermediate the baffles B, one of the baffles B being arranged at the upper end of the column of baffles and one of the baffles C being arranged at the lower end of said column. Accordingly, oil that is introduced into the separating chamber A above the topmost baffle of the column will flow downwardly over the baffles B and C in a substantially zig-zag or tortuous path, and in traveling downwardly over said baffles, will be freed of the vapors contained in same.

In the form of my invention herein illustrated the means for introducing oil into the separating chamber A consists of an annular-shaped spraying device 3 connected to an oil supply pipe 4 and provided with orifices 3$^a$ through which the oil is discharged onto the downwardly inclined surface on the top most baffle B of the column of baffles. As previously stated, it is preferable to subject the oil to heat under pressure or confinement prior to introducing the oil into the separating chamber, and as the orifices 3$^a$ of the spraying device 3 divide the incoming oil into small streams, a considerable portion of the constituents of the oil whose boiling points are below the temperature of the oil will be vaporized almost immediately after the oil enters the separating chamber, thereby resulting in a mixture of oil and vapor being delivered onto the upper baffle of the column of baffles in the separating chamber. The baffles C are of greater diameter than the baffles B, and as they are arranged underneath the baffles B, the liquid oil will flow outwardly on the baffles B and then inwardly on the baffles C, and thus follow a substantially zig-zag path in traveling downwardly through the separating chamber. In order to promote the vaporization of such vaporizable oil as is not immediately converted into vapor upon entering the separating chamber means is provided for distributing the oil uniformly over the baffles and mechanically breaking up the liquid oil as it flows downwardly over the baffles. In the form of my invention herein illustrated the means that is used for this purpose consists of serrated portions 5 on the baffles B that project upwardly from the lower edges of said baffles preferably at an angle of approximately 90°, the triangular-shaped spaces of said serrated portions causing the oil to be distributed uniformly over the inwardly-inclined baffles C and the teeth of said serrated portions causing the oil to be broken up, thereby releasing the vapors which are mechanically confined in the oil.

Most of the vapor which is separated from the oil on the baffles B travels upwardly through the separating chamber through the annular space between the side wall of said chamber and the peripheral portions of the baffles C, the inclined undersides of the baffle C tending to deflect the vapor outwardly towards the side wall of the separating chamber. Preferably the baffles C are provided at their upper edges with upwardly projecting cylindrical-shaped portions 6 that provide a well defined path of travel for the vapor and prevent the vapor from flowing inwardly into the path of travel of the oil that flows downwardly over the inner sides of the baffle C and over the outer sides of the baffle B. The vapor which separates from the oil on the baffles C travels upwardly, and upon coming in contact with the underside of the baffles B, is deflected inwardly towards the center of the separating chamber into upwardly-projecting, cylindrical-shaped portions 7 on the baffles B that virtually form a flue at the center of the separating chamber up through which travels vapor separated from oil on the baffles C. By constructing the baffles in this manner I insure the vapors traveling through the separating chamber in paths separate and distinct from the path of travel of the downwardly flowing liquid oil, and accordingly, I eliminate the possibility of the vapor re-condensing or being absorbed by the oil in appreciable quantities, as would be apt to occur if the vapor were subjected to a scrubbing action by the oil in traveling upwardly through the separating chamber.

The vapor that flows upwardly through the separating chamber sometimes carries finely divided particles of liquid oil, and in order to remove said finely divided particles of liquid oil from the vapor before the vapor escapes from the separating chamber, I arrange a number of horizontally-disposed baffles 8 and 9 in the upper portion of the separating chamber between the vapor outlet 1 and the topmost baffle of the vaporizing means and construct said baffles 8 and 9 in such a manner that the escaping vapors will be effectively freed of any finely divided particles of liquid oil which they may contain before reaching the vapor outlet 1 of the separating chamber. As shown in Figure 1, the baffles 8 are arranged above and below the baffle 9 and are imperforate except for annular rows of small orifices 8$^a$ arranged near the peripheral edges of same. The baffle 9 is provided at its center with a large opening 9$^a$ that is surrounded by an upwardly-projecting rim 9$^b$ and said baffle 9 is also provided with an annular row of small orifices 9$^c$ arranged in close proximity to the rim 9$^b$. The baffle 9 is of greater diameter than the baffles 8 and the peripheral edge of said baffle 9 is arranged in close proximity to the side wall of the separating chamber A. Consequently, the vapor is compelled to pass around the periphery of the bottom baffle 8, then through the center opening of the intermediate baffle 9 and then around the periphery of the top baffle 8 in its passage to the vapor outlet 1 of the separating chamber. The liquid oil which is separated from the vapor by the baffles 8 and 9 is confined on the upper surfaces of said baffles by upwardly-projecting flanges 10 at the peripheries of said baffles and is allowed to escape slowly from said baffles through the openings 8ᵃ and 9ᶜ therein.

Any suitable means may be used to support the various baffles in the separating chamber, such, for example, as rods 11 projecting upwardly through said baffles and sustained by rails 12 carried by brackets 13 on the side wall of the separating chamber, the various baffles being maintained in spaced relation with each other by sleeves 14 mounted on the rods 11 and interposed between the baffles, as shown in Figure 1.

If desired, vapor from a still may be introduced into the separating chamber A through an inlet 15 at the lower end of said chamber, as shown in Figure 1. When the apparatus is operated in this manner the vapor that is admitted to the separating chamber through the inlet opening 15 will be brought more or less closely in contact with the liquid oil escaping from the lowermost baffle C of the column of baffles in the separating chamber, and accordingly, will be scrubbed by the liquid oil escaping from said lowermost baffle. Consequently the apparatus can be used for two purposes, namely, it can be used to promote the vaporization of oil and separate vapors from liquid oil with a minimum scrubbing effect by introducing vapor laden oil into the separating chamber through the oil inlet pipe 4, and it can be used to scrub or condense vapors that are introduced into the separating chamber through the vapor inlet 15 at the lower end of the separating chamber.

Having thus described my invention, what I claim as new and desire to secure by Letters Patent is:

1. A vapor separator, comprising a vertically-disposed separating chamber provided adjacent its upper end with a vapor outlet, a series of frusto-conical-shaped baffles arranged in said chamber, one above the other, and provided at their upper ends with tubular portions that co-operate with each other to virtually form an uptake flue through which the vapors travel upwardly at the center of said chamber, a series of inverted frusto-conical-shaped baffles arranged between the baffles first referred to and provided at their upper edges with flanges arranged in close proximity to the side wall of said chamber, the lower ends of the baffles of the series first referred to being spaced away from the second series of baffles, and an annular liquid supplying device arranged inside of the separating chamber above the top baffle and provided on its underside with orifices through which the liquid is projected downwardly in the form of a spray onto said top baffle.

2. A vapor separator, comprising a vertically-disposed, tubular-shaped separating chamber provided adjacent its upper end with a vapor outlet, a series of frusto-conical-shaped baffles arranged in said chamber, one above the other, and provided at their upper ends with openings up through which the vapors travel and at their lower ends with serrated portions for the purpose described, inverted frusto-conical-shaped baffles arranged in said chamber intermediate the baffles first referred to and having their upper ends spaced away from but positioned in close proximity to the side wall of said chamber, the top faces of said inverted baffles being spaced away from the serrated portions of the baffles first referred to, means for spraying liquid onto the topmost baffle of the column of baffles in said chamber, and a plurality of horizontally-disposed baffles arranged in superimposed relation between the topmost baffle of the column and the vapor outlet of the separating chamber for causing the escaping vapor to flow in a zig-zag path, said horizontally-disposed baffles being provided with rims for confining the liquid that is separated from said vapor and also having holes through which the separated liquid escapes and flows downwardly over said frusto-conical-shaped baffles.

JAMES M. WADSWORTH.